United States Patent [19]

Kobayashi

[11] Patent Number: 4,664,975
[45] Date of Patent: May 12, 1987

[54] MAGNETIC RECORDING MEDIA COMPRISING AN ANTISTATIC AGENT-CONTAINING RESIN LAYER PROVIDED BETWEEN A SUPPORT AND A MAGNETIC RECORDING LAYER

[75] Inventor: Osamu Kobayashi, Mito, Japan

[73] Assignee: Victor Company of Japan, Limited, Japan

[21] Appl. No.: 904,842

[22] Filed: Sep. 5, 1986

Related U.S. Application Data

[63] Continuation of Ser. No. 820,881, Jan. 17, 1986, abandoned, which is a continuation of Ser. No. 521,579, Aug. 9, 1983, abandoned.

[30] Foreign Application Priority Data

Aug. 9, 1982 [JP] Japan ............................ 57-137331
Aug. 9, 1982 [JP] Japan ............................ 57-137334
Aug. 9, 1982 [JP] Japan ............................ 57-137340

[51] Int. Cl.$^4$ ............................................ G11B 5/708
[52] U.S. Cl. .................................. 428/323; 428/694; 428/900
[58] Field of Search ............... 428/323, 694, 900; 427/131

[56] References Cited

U.S. PATENT DOCUMENTS

| 4,275,113 | 6/1981 | Saito et al. | 428/900 |
| 4,468,436 | 8/1984 | Okita et al. | 427/131 |
| 4,515,856 | 5/1985 | Matsumoto | 428/694 |
| 4,532,178 | 7/1985 | Matsumoto | 427/131 |

*Primary Examiner*—George F. Lesmes
*Assistant Examiner*—William M. Atkinson
*Attorney, Agent, or Firm*—Lowe, Price, Leblanc, Becker & Shur

[57] ABSTRACT

A magnetic recording medium is disclosed which comprises a support, a non-magnetic resin layer formed on at least one side of the support and made of a mixture of an antistatic agent and a resin binder, and a magnetic recording layer formed on said non-magnetic resin layer and made of magnetic particles dispersed throughout a binder. The antistatic agent is used in an amount of from 1 to 100 parts by weight per 100 parts by weight of the binder of the non-magnetic resin layer. The mixture may further comprise a curing agent, or particles of carbon black and/or titanium monoxide.

9 Claims, No Drawings

MAGNETIC RECORDING MEDIA COMPRISING AN ANTISTATIC AGENT-CONTAINING RESIN LAYER PROVIDED BETWEEN A SUPPORT AND A MAGNETIC RECORDING LAYER

This application is a continuation of application Ser. No. 820,881, filed Jan. 17, 1986 which is a continuation of application Ser. No. 521,579 Aug. 9, 1983 both now abandoned.

BACKGROUND OF THE INVENTION

1. Field of the Invention

This invention relates to magnetic recording media which have improved antistaticity and in which the magnetic layer is more unlikely to peel than ordinary magnetic recording media. By the term "magnetic recording media" used herein are meant magnetic tapes for video and audio recording purposes, magnetic recording discs and cards, and the like media.

2. Description of the Prior Art

In general, magnetic recording media such as magnetic tapes comprise a support such as, for example, a polyester film, and a magnetic layer formed on the support and made of a mixture of magnetic particles, binders and other various additives. These materials are all insulative in nature. Especially, magnetic particles such as gamma-$Fe_2O_3$ particles are so high in electric resistance that magnetic recording media using these particles also become high in electric resistance. Upon frictional contact with magnetic heads, guide pins and the like, the magnetic recording medium tends to be electrostatically charged. This in turn leads to ready deposition of dust on the medium.

In order to avoid this, it is usual to add to the magnetic layer various surface active agents such as anionic, cationic, nonionic and amphoteric active agents, or carbon black. Magnetic tapes which have surface active agents contained in the magnetic layer do not necessarily show a satisfactory antistatic effect. In addition, such magnetic tapes are disadvantageous in that their magnetic flux density and sensitivity become poor due to the presence of the agents in the magnetic layer.

SUMMARY OF THE INVENTION

It is an object of the present invention to provide magnetic recording media which are barely electrostatically charged upon contact with magnetic heads, guide pins and the like parts whereby dust is unlikely to electrostatically deposit on the media.

It is another object of the invention to provide magnetic recording media which have an excellent antistatic effect without a sacrifice of the magnetic flux density and sensitivity.

It is a further object of the invention to provide magnetic recording media which comprise a non-magnetic resin layer beneath the magnetic layer particles whereby an adhesion strength of the magnetic layer is improved.

The present invention is characterized by the presence of a non-magnetic resin layer between a support and a magnetic layer. The non-magnetic resin layer comprises an antistatic agent dispersed or dissolved in a resin binder. The resin layer may further comprise finely powdered TiO and/or carbon black particles. This layer may be formed either on one side or opposite sides of the support, depending on the type of magnetic recording medium.

DETAILED DESCRIPTION AND PREFERRED EMBODIMENTS OF THE INVENTION

The non-magnetic resin layer intervening between a support and a magnetic layer is made of a composition of an antistatic agent and a binder. The antistatic agents useful for the purposes may be any known antistats which are ordinarily used by mixing with various plastics, fibers and the like. The antistatic agents include, for example, anionic active agents such as alkylsulfates, alkylarylsulfates, alkylphosphates and alkylaminesulfates, cationic active agents such as quaternary ammonium salts, quaternary ammonium resins, imidazoline derivatives and the like, nonionic active agents such as sorbitan esters, alkyl ethers, alkyl esters, various amines or amides, ethanolamides and the like, and amphoteric active agents such as betaines. Suitable examples of the agents are as follows.

(1) Alkyl sulfates represented by the general formulas

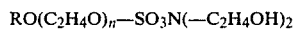
$RO(C_2H_4O)_n-SO_3N(-C_2H_4OH)_2$ in which R is an aliphatic hydrocarbon group having from 11 to 17 carbon atoms and particularly 12 carbon atoms and n is a suitable integer, and

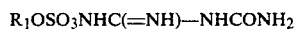
$R_1OSO_3NHC(=NH)-NHCONH_2$ in which $R_1$ represents an aliphatic hydrocarbon group having from 11 to 17 carbon atoms and particularly 16 carbon atoms.

(2) Alkylarylsulfates represented by the formula

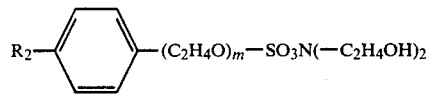

in which $R_2$ represents, for example, an aliphatic hydrocarbon group having from 11 to 17 carbon atoms and m is a suitable integer.

(3) Alkylphosphates represented by the formula

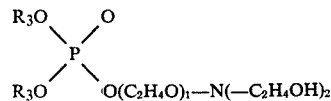

in which each $R_3$ represents an aliphatic hydrocarbon group having from 11 to 17 carbon atoms, and l is a suitable integer.

(4) Alkylaminesulfates represented by the formulas

$R_4NHC_2H_4OSO_3N(C_2H_4OH)_2$ in which $R_4$ represents an aliphatic hydrocarbon group having from 11 to 17 carbon atoms.

$R_5CONHC_2H_4OSO_3Na$ in which $R_5$ represents an aliphatic hydrocarbon group having from 11 to 17 carbon atoms.

(5) Quaternary ammonium salts represented by the formula

$[R_6CONHC_3H_6N(CH_3)_2C_2H_4OH]^{\oplus}X^-$ in which $R_6$ represents an aliphatic hydrocarbon group having from 11 to 17 carbon atoms, and X represents $NO_3$ or $ClO_4$.

(6) Quaternary ammonium resins represented by the formula

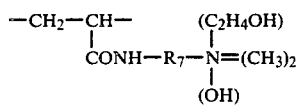

in which $R_7$ represents an aliphatic hydrocarbon group having from 11 to 17 carbon atoms.

(7) Imidazoline derivatives represented by the formula

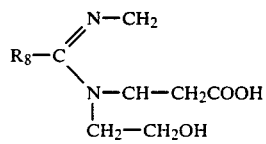

in which $R_8$ represents an aliphatic hydrocarbon group having from 11 to 17 carbon atoms.

(8) Sorbitan esters such as polyoxyethylene sorbitan monostearate.

(9) Polyoxyethylene alkyl or aryl ethers

(10) Ethanolamides represented by the formula $$R_9CONH(C_2H_4O)_2H$$

in which $R_9$ represents an aliphatic hydrocarbon group having from 11 to 17 carbon atoms.

(11) Betaines represented by the formulas

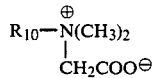

in which $R_{10}$ represents an aliphatic hydrocarbon group having from 11 to 17 carbon atoms, and

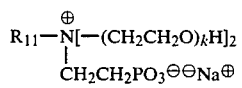

in which $R_{11}$ represents an aliphatic hydrocarbon group having from 11 to 17 carbon atoms, and k is a suitable integer.

The above-indicated antistatic agents are typical agents and other antistatic agents may also be used including primary, secondary and tertiary amines. These agents may be used singly or in combination, and are used in combination with binder resins. Examples of the binder resins are not limited to specific resins. Preferable resins include polyurethane resins, polyester resins, acrylic resins, nitrile rubbers, butyral resins and the like. These resins are commercially available from various companies.

In practice, a binder resin is first dissolved in an organic solvent such as toluene, methyl ethyl ketone, cyclohexanone or the like. Thereafter, a predetermined amount of an antistatic agent is added to the solution and uniformly mixed. The resulting solution is applied onto at least one side of a support by a suitable application technique, such as a gravure coating, so that a dry thickness is in the range of about 0.1 to 2.5 microns. The support is dried to form a non-magnetic resin layer thereon and is subsequently applied with a magnetic paint comprising magnetic particles, a binder and various additives and treated as usual. The resin layer and magnetic layer may be applied to one side or opposite sides of the support depending on the type of medium.

The antistatic agent is generally used in an amount of from 1 to 100 parts by weight, preferably over 5 parts by weight, per 100 parts by weight of the binder. Smaller amounts are less effective whereas larger amounts are unfavorable because an antistatic agent tends to migrate to the magnetic layer. In the latter case, the magnetic layer is liable to separate from the non-magnetic coating.

As a matter of course, a curing agent such as an isocyanate for binder resins may be added to the composition for crosslinkage of the resin as usual. Such curing agent is ordinarily used in an amount of from 5 to 100 parts by weight per 100 parts by weight of the binder. In this case, a support onto which a solution of an antistatic agent, a binder resin, and a curing agent is applied is dried and cured at about 55° C. for a period of 24 to 72 hours.

In order to further improve the antistatic property and light transmittance of the recording medium, particles of TiO, carbon black or a mixture thereof are added to the resin solution comprising an antistatic agent. The carbon black is added in an amount of from about 5 to 30 parts by weight per 100 parts by weight of the binder contained in the non-magnetic resin layer. On the other hand, TiO particles are used in larger amounts because of the high density and good dispersability of TiO particles, i.e. 50 to 1000 parts by weight, preferably about 400 to 800 parts by weight, based on parts by weight of the binder. When TiO and carbon black are used in combination, the amount of the mixture depends on the mixing ratio. When antistatic agents are not used in combination with the TiO or carbon black, it is preferable to use the agent in an amount of 5 parts by weight or more per 100 parts by weight of the binder. This is because the synergistic effect with the TiO or carbon black cannot be expected.

Carbon black particles used for these purposes should preferably be finely divided to have an average size of from 1 to 50 millimicrons. TiO particles should favorably have an average size of about 0.01 to 5 microns, preferably 0.01 to 1 micron.

Carbon black may be of any origins and includes, for example, furnace blacks, lamp blacks, thermal blacks, acetylene blacks, channel blacks, and the like.

After formation of the non-magnetic resin layer, a magnetic layer is formed on the resin layer as mentioned before.

The magnetic layer is formed by any known techniques. For instance, a magnetic paint of magnetic particles and a binder in a solvent is applied to the non-magnetic resin layer. The magnetic paint is briefly described.

Useful magnetic materials include, for example, ferromagnetic iron oxides such as gamma-$Fe_2O_3$ and $Fe_3O_4$ with or without additional metals such as Co, Ni, Mn and the like, ferromagnetic metals such as Fe, Co, Ni and the like, and alloys thereof. These metals or alloys may include additional metals such as Al, Cr, Mn, Cu and the like. Other ferromagnetic materials such as $CrO_2$ may also be used.

Binders for these magnetic materials may be any known thermoplastic resin, thermosetting resins, and mixtures thereof. Typical examples of the thermoplastic resins include vinyl chloride-vinyl acetate copolymers, vinyl chloride-vinylidene chloride copolymers, acrylic esterstyrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic rubber resins. Examples of the thermosetting resins include phenolic resins, epoxy resins, alkyd resins, silicone resins, urea-formaldehyde resins, mixtures of isocyanates and polyols, and the like resins. These binder resins, both thermoplastic and thermosetting, may be used singly or in combination.

In practice, magnetic materials are dispersed in resin binders dissolved in solvents. The resulting dispersion is applied as described before and cured to form a magnetic layer on the non-magnetic resin layer as usual. Typical solvents for binders are alcohols such as methanol, ethanol, and the like, aromatic compounds such as xylene, toluene, benzene and the like, ketones such as acetone, methyl ethyl ketone, methyl isobutyl ketone and the like, and mixtures thereof. As a matter of course, the dispersion may further comprise any known additives such as dispersants, lubricants, abrasive agents, anti-static agents, surfactants and the like as is well known in the art.

Suitable supports include, for example, films, foils, sheets of a variety of materials. Typical materials include synthetic or semi-synthetic resins such as polyesters, polyolefins, cellulose derivatives, and the like, metals such as aluminum, copper and the like, glasses or ceramics. Of these, synthetic resins including polyesters are preferably used.

The present invention is particularly described by way of examples.

EXAMPLE 1

Twenty parts by weight of an amine salt (Esomin T/12, product of Lion Oils and Fats Co., Ltd.), 500 parts by weight of a mixed solvent of methyl ethyl ketone, toluene and methyl isobutyl ketone, and 100 parts by weight of a polyurethane elastomer were uniformly mixed. The resulting solution was coated on a polyester film and dried. The resin layer had a dry thickness of 0.5 micron. Thereafter, a magnetic paint composed of 100 parts by weight of Co-gamma-$Fe_2O_3$, 10 parts by weight of vinyl chloride-vinyl acetate-vinyl alcohol terpolymer (VAGH, trade name of Union Carbide Corp. of U.S.A.), 10 parts by weight of a polyurethane elastomer (Pandex T-5260, made by Dainippon Ink Co., Ltd.), 1 part by weight of lecithin, and 300 parts by weight of a mixed solvent of toluene, methyl ethyl ketone and methyl isobutyl ketone was applied onto the non-magnetic resin layer, calendered, and heated at about 55° C. for about 20 hours. The thus heated film was slit into a ½ inch wise magnetic tape for use in a video tape recorder.

EXAMPLE 2

The general procedure of Example 1 was repeated using a solution of 18 parts by weight of an alkyl ester antistatic agent (Newcol 150, product of Nippon Emulsifier Co., Ltd.) and 100 parts by weight of a polyurethane elastomer in 500 parts by weight of a mixed solution of methyl ethyl ketone, toluene and methyl isobutylene ketone, thereby obtaining a magnetic tape.

EXAMPLE 3

The general procedure of Example 1 was repeated using a solution of 18 parts by weight of an alkyl ether antistatic agent (Elimina N, product of Marubishi Yuka Ind. Co., Ltd.), and 100 parts by weight of a polyurethane elastomer in 500 parts by weight of a mixed solution of methyl ethyl ketone, toluene and methyl isobutylene ketone, thereby obtaining a magnetic tape.

EXAMPLE 4

The general procedure of Example 1 was repeated using a solution of 20 parts by weight of an alkylsulfonate antistatic agent (Statexan KI, product of Bayer A. G.), and 100 parts by weight of a polyurethane elastomer in 500 parts by weight of a mixed solution of methyl ethyl ketone, toluene and methyl isobutylene ketone, thereby obtaining a magnetic tape.

EXAMPLE 5

The general procedure of Example 1 was repeated using a solution of 22 parts by weight of an alkylphosphate antistatic agent (Elenon No. 19 M, product of Daiichi Kogyo Pharm. Co., Ltd.), and 100 parts by weight of a polyurethane elastomer in 500 parts by weight of a mixed solution of methyl ethyl ketone, toluene and methyl isobutylene ketone, thereby obtaining a magnetic tape.

EXAMPLE 6

The general procedure of Example 1 was repeated using a solution of 18 parts by weight of a quaternary ammonium salt antistatic agent (Catanac SN, product of American Cyanamide Inc.), and 100 parts by weight of a polyurethane elastomer in 500 parts by weight of a mixed solution of methyl ethyl ketone, toluene and methyl isobutylene ketone, thereby obtaining a magnetic tape.

EXAMPLE 7

The general procedure of Example 1 was repeated using a solution of 18 parts by weight of a sorbitan derivative antistatic agent (Sorbon S, product of Toho Chem. Co., Ltd.), and 100 parts by weight of a polyurethane elastomer in 500 parts by weight of a mixed solution of methyl ethyl ketone, toluene and methyl isobutylene ketone, thereby obtaining a magnetic tape.

EXAMPLES 8-11

The general procedure of Example 1 was repeated using 15 parts by weight of a betaine antistatic agent (Texnol R2, product of Nippon Emulsifier Co., Ltd.) as Example 8, 15 parts by weight of an imidazoline antistatic agent (Lipomin LH, product of Lion Oils and Fats Co., Ltd.) as Example 9, and a mixture of 8 parts by weight of an amine salt (Esomine T/12, product of Lion Co., Ltd.) and an alkylphosphate (Enolenon No. 19 M, product of Daiichi Kogyo Pharm. Co., Ltd.) as Example 10, and a mixture of 10 parts by weight of an alkyl ether antistatic agent (Elimina N, product of Marubishi Yuka Ind. Co., Ltd.) and a quaternary ammonium salt (Catanac SN, product of American Cyanamide Co., Ltd.) as Example 11, thereby obtaining magnetic tapes.

EXAMPLE 12

The general procedure of Example 1 was repeated using a solution of 3 parts by weight of an alkylsulfonate (Statexan KI, product of Bayer A. G.), 15 parts by weight of a quaternary salt (Catanac SN, product of American Cyanamide Co., Ltd.), and 100 parts by weight of vinyl chloride-vinyl acetate-vinyl alcohol terpolymer in 500 parts by weight of a mixed solvent of methyl ethyl ketone, toluene and methyl isobutyl ketone, thereby obtaining a magnetic tape.

EXAMPLE 13

The general procedure of Example 1 was repeated using a solution of 20 parts by weight of a quaternary ammonium salt (Catanac SN, product of American Cyanamide Co., Ltd.) and 100 parts by weight of a polyester resin in 500 parts by weight of a mixed solvent of methyl ethyl ketone, toluene and methyl isobutyl ketone, thereby obtaining a magnetic tape.

COMPARATIVE EXAMPLE 1

The general procedure of Example 1 was repeated except that the amine salt-containing polyurethane elastomer layer was not formed but the magnetic paint was directly formed on the polyester film, thereby obtaining a magnetic tape.

COMPARATIVE EXAMPLE 2

The general procedure of Example 1 was repeated using a solution of 20 parts by weight of carbon black and 100 parts by weight of a polyurethane elastomer in 500 parts by weight of a mixed solvent of methyl ethyl ketone, toluene and methyl isobutyl ketone, thereby obtaining a magnetic tape.

COMPARATIVE EXAMPLE 3

The general procedure of Example 1 was repeated using a solution of 20 parts by weight of carbon black and 100 parts by weight of a polyester resin in 500 parts by weight of a mixed solvent of methyl ethyl ketone, toluene and methyl isobutyl ketone, thereby obtaining a magnetic tape.

The thus obtained magnetic tapes were each subjected to the measurement of antistatic characteristics at a temperature of 25° C. and a relative humidity of 40%, including a maximum chargeable voltage (V), half life (seconds), and coefficient of static friction $\mu_s$ prior to and after 50 travelling cycles. In addition, a peeling resistance of the magnetic layer of each tape was visually observed by a method in which an adhesive tape was attached to a sample in a predetermined area and was peeled off quickly. The results are shown in Table 1 below.

TABLE 1

| | Maximum Chargeable Voltage V | Half Life | $\mu_s$ Before Travelling Operation | $\mu_s$ After 50 Cycles of Travelling Operation | Peeling Test |
|---|---|---|---|---|---|
| Ex. 1 | 600 | 12 | 0.38 | 0.52 | Not peeled |
| Ex. 2 | 570 | 14 | 0.43 | 0.48 | " |
| Ex. 3 | 600 | 12 | 0.41 | 0.60 | " |
| Ex. 4 | 600 | 12 | 0.41 | 0.42 | " |
| Ex. 5 | 620 | 15 | 0.38 | 0.55 | " |
| Ex. 6 | 620 | 15 | 0.43 | 0.53 | " |
| Ex. 7 | 620 | 14 | 0.43 | 0.57 | " |
| Ex. 8 | 580 | 10 | 0.41 | 0.60 | " |
| Ex. 9 | 600 | 12 | 0.44 | 0.48 | " |
| Ex. 10 | 580 | 10 | 0.42 | 0.42 | " |
| Ex. 11 | 570 | 10 | 0.51 | 0.53 | " |
| Ex. 12 | 600 | 12 | 0.44 | 0.53 | " |
| Ex. 13 | 570 | 10 | 0.42 | 0.42 | " |
| Com. Ex. 1 | 1100 | 250 | 0.51 | 2.20 | Completely Peeled |
| Com. Ex. 2 | 1050 | 180 | 0.49 | 1.81 | Partially peeled |
| Com. Ex. 3 | 1050 | 160 | 0.49 | 1.90 | Partially peeled |

As will be seen from the above test results, the magnetic tapes according to the invention are charged to a level as low as 570 to 620 V even under conditions of a relative humidity of 40% which is low enough to cause the media to be electrostatically charged. The half life of the voltage is also as short as 10 to 15 seconds and the coefficient of static friction prior to the travelling operation is not so different from the coefficient after the 50 cycles. Thus, the repeated travelling operations give little adverse influences on the magnetic tapes.

In contrast, the magnetic tapes of the Comparative Examples have unfavorably high chargeable levels of 1050 to 1100 V with the half life being as long as 160 to 250 seconds. The coefficient of static friction after repetition of 50 cycles is much larger than the initial coefficient. This means that the magnetic tapes of the Comparative Examples are readily, electrostatically charged upon contact with magnetic heads and guide pins when travelled, permitting due to be electrostatically attached thereto. Thus, as will be noted, the magnetic tapes of the present invention are superior to the tapes of the Comparative Examples.

Furthermore, the procedure of Example 1 was repeated except that the solution was further admixed with a polyisocyanate curing agent (Coronate L, Nippon Polyurethane Co., Ltd.) in different amounts ranging from 5 to 100 parts by weight based on binder used, followed by curing at about 55° C. for 24 hours. The resulting magnetic tapes were better in peeling strength than the magnetic tape of Example 1.

EXAMPLE 14

Fifteen parts by weight of carbon black, 4 parts by weight of an amine salt (Esomin T/12, product of Lion Oils and Fats Co., Ltd.), 100 parts by weight of a polyurethane elastomer, and 400 parts by weight of a mixed solvent of methyl ethyl ketone, toluene and methyl isobutyl ketone were mixed in a ball mill. The resulting dispersion was applied onto a polyester film and dried. The resin layer had a dry thickness of about 1 micron. Thereafter, a magnetic paint composed of 100 parts by weight of Co-gamma-$Fe_2O_3$, 10 parts by weight of a vinyl chloride-vinyl acetate-vinyl alcohol terpolymer (VAGH, trade name of Union Carbide Corp. of U.S.A.), 10 parts by weight of a polyurethane elastomer (Pandex T-5260, made by Dainippon Ink Co., Ltd.), 1 part by weight of lecithin, and 300 parts by weight of a mixed solvent of toluene, methyl ethyl ketone and methyl isobutyl ketone was applied onto the non-magnetic resin layer, calendered, and heated at about 55° C. for about 20 hours. The thus heated film was slit into ½ inch wide magnetic tapes for use in a video tape recorder.

EXAMPLES 15-24

The general procedure of Example 14 was repeated using, instead of the amine salt, the following antistatic agents.

| Example No. | Antistatic Agent | Amount (parts by wt.) |
|---|---|---|
| 15 | Alkyl ester (Newcol 150, product Nippon Emulsifier Co., Ltd.) | 4 |
| 16 | Alkyl ether (Elimina N, product of Marubishi Yuka Ind. Co., Ltd.) | 3 |
| 17 | Alkylsulphonate (Statexan KI, product of Bayer A.G.) | 3 |
| 18 | Alkylphosphate (Elenon No. 19M, product of Daiichi Kogyo Pharm. Co., Ltd.) | 4 |
| 19 | Quaternary ammonium salt (Catanac SN, Product of American Cyanamide Co., Ltd.) | 4 |
| 20 | Sorbitan derivative (Sorbon S, product of Toho Chem. Co., Ltd.) | 4 |
| 21 | Betaine derivative (Texnol R2, product of Nippon Emulsifier Co., Ltd.) | 5 |
| 22 | Imidazoline derivative (Libomine LH, product of Lion Oils and Fats Co., Ltd.) | 3 |
| 23 | Amine salt (Esomine T/12, product of Lion Oils and Fats Co., Ltd.) Alkylphosphate (Elenon No. 19M, product of Daiichi Kogyo Pharm. Co., Ltd.) | 2 3 |
| 24 | Alkyl ether (Elimina N, product of Marubishi Yuka Ind. Co., Ltd.) Quaternary ammonium salt (Catanac SN, product of American Cyanamide Co., Ltd.) | 2 3 |

As a result, ten magnetic tapes were obtained using different types of antistatic agents.

EXAMPLE 25

The general procedure of Example 14 was repeated except that a dispersion for the non-magnetic resin layer was made of 15 parts by weight of carbon black, 2 parts by weight of an alkylsulfonate (Statexan KI, product of Bayer A. G.), 4 parts by weight of a quaternary ammonium salt (Catanac SN, product of American Cyanamide Co., Ltd.), 100 parts by weight of a vinyl chloride-vinyl acetate-vinyl alcohol terpolymer, and 400 parts by weight of a mixed solvent of methyl ethyl ketone, toluene and methyl isobutyl ketone, thereby obtaining a magnetic tape.

EXAMPLE 26

The general procedure of Example 14 was repeated except that a dispersion composition of 15 parts by weight of carbon black, 4 parts by weight of a quaternary ammonium salt (Catanac SN, American Cyanamide Co., Ltd.), 100 parts by weight of a polyurethane elastomer, and 400 parts by weight of a mixed solvent of methyl ethyl ketone, toluene and methyl isobutyl ketone was used, and the quaternary ammonium salt was added to the carbon black so as to allow the salt to be adsorbed on the carbon black surfaces, to which the mixed solvent and polyurethane were added for dispersion, thereby obtaining a magnetic tape.

COMPARATIVE EXAMPLE 4

The general procedure of Example 14 was repeated except that the non-magnetic resin layer was not formed but the magnetic paint of Example 14 to which 15 parts by weight of carbon black was added was directly applied to the polyester film, thereby obtaining a magnetic tape.

COMPARATIVE EXAMPLE 5

The general procedure of Example 14 was repeated using, instead of the dispersion of Example 14, a dispersion of 15 parts by weight of carbon black and 100 parts by weight of a polyurethane elastomer in 400 parts by weight of a mixed solvent of methyl ethyl ketone, toluene and methyl isobutyl ketone, thereby obtaining a magnetic tape.

The magnetic tapes of Examples 14 through 26 and Comparative Examples 4 and 5 were subjected to the measurement similar to the foregoing examples under conditions of a temperature of 40° C. and a relative humidity of 25%.

The results are shown in Table 2 below.

TABLE 2

| | Maximum chargeable voltage (V) | Half Life | $\mu_s$ Before Travelling Operation | $\mu_s$ After 50 Cycles of Travelling Operation | Peeling Test |
|---|---|---|---|---|---|
| Ex. 14 | 700 | 33 | 0.45 | 0.55 | Not peeled |
| Ex. 15 | 710 | 28 | 0.42 | 0.49 | " |
| Ex. 16 | 690 | 29 | 0.45 | 0.51 | " |
| Ex. 17 | 700 | 31 | 0.44 | 0.48 | " |
| Ex. 18 | 680 | 33 | 0.45 | 0.49 | " |
| Ex. 19 | 700 | 30 | 0.45 | 0.61 | " |
| Ex. 20 | 700 | 33 | 0.44 | 0.56 | " |
| Ex. 21 | 730 | 30 | 0.42 | 0.53 | " |
| Ex. 22 | 650 | 29 | 0.44 | 0.48 | " |
| Ex. 23 | 700 | 31 | 0.40 | 0.41 | " |
| Ex. 24 | 710 | 28 | 0.47 | 0.58 | " |
| Ex. 25 | 710 | 30 | 0.44 | 0.48 | " |
| Ex. 26 | 710 | 31 | 0.41 | 0.49 | " |
| Com. Ex. 4 | 1160 | 152 | 0.40 | 1.77 | Completely Peeled |
| Com. Ex. 5 | 1050 | 95 | 0.48 | 1.56 | Partially peeled |

As will be seen from the above results, similar tendencies are obtained as in Examples 1 through 13 and Comparative Examples 1 through 3.

EXAMPLE 27

One hundred by weight of TiO, 4 parts by weight of an amine salt (Esomin T/12, product of Lion Oils and Fats Co., Ltd.), 15 parts by weight of a polyurethane elastomer, and 300 parts by weight of a mixed solvent of methyl ethyl ketone, toluene and methyl isobutyl ketone were mixed in a ball mill. The resulting dispersion was applied onto a polyester film and dried. The resin layer had a dry thickness of about 1 micron. Thereafter, a magnetic paint composed of 100 parts by weight of a Co-gamma-$Fe_2O_3$, 10 parts by weight of a vinyl chloride-vinyl acetate-vinyl alcohol terpolymer (VAGH, trade name of Union Carbide Corp. of U.S.A.), 10 parts by weight of a polyurethane elastomer (Pandex T-5260, made by Dainippon Ink Co., Ltd.), 1 part by weight of lecithin, and 300 parts by weight of a mixed solvent of toluene, methyl ethyl ketone and methyl isobutyl ketone was applied onto the non-magnetic resin layer, calendered, and heated at about 55° C. for about 20 hours. The thus heated film was slit into ½ inch wide magnetic tapes for use in a video tape recorder.

EXAMPLES 28 THROUGH 37

The general procedure of Example 27 was repeated using, instead of the amine salt, the following antistatic agents.

| Example No. | Antistatic Agent | Amount (parts by wt.) |
|---|---|---|
| 28 | Alkyl ester (Newcol 150, product of Nippon Emulsifer Co., Ltd.) | 6 |
| 29 | Alkyl ether (Elimina N, product of Marubishi Yuka Ind. Co., Ltd.) | 4 |
| 30 | Alkylsulphonate (Statexan KI, product of Bayer A.G.) | 2 |
| 31 | Alkylphosphate (Elenon No. 19M, product of Daiichi Kogyo Pharm. Co., Ltd.) | 5 |
| 32 | Quaternary ammonium slat (Catanac SN, Product of American Cyanamide Co., Ltd.) | 6 |
| 33 | Sorbitan derivative (Sorbon S, product of Toho Chem. Co., Ltd.) | 7.5 |
| 34 | Betaine derivative (Texnol R2, product of Nippon Emulsifier Co., Ltd.) | 9 |
| 35 | Imidazoline derivative (Libomine LH, product of Lion Oils and Fats Co., Ltd.) | 7.5 |
| 36 | Amine salt (Esomine T/12, product of Lion Oils and Fats Co., Ltd.) | 2 |
|  | Alkylphosphate (Elenon No. 19M, product of Daiichi Kogyo Pharm. Co., Ltd.) | 2 |
| 37 | Alkyl ether (Elimina N, product of Marubishi Yuka Ind. Co., Ltd.) | 2 |
|  | Quaternary ammonium salt (Catanac SN, product of American Cyanamide Co., Ltd.) | 3 |

As a result, ten magnetic tapes were obtained using different types of antistatic agents.

EXAMPLE 38

The general procedure of Example 27 was repeated except that a dispersion for the non-magnetic resin layer was made of 100 parts by weight of TiO, 2 parts by weight of an alkylsulfonate (Statexan KI, product of Bayer A. G.), 6 parts by weight of a quaternary ammonium salt (Catanac SN, product of American Cyanamide Co., Ltd.), 18 parts by weight of a vinyl chloride-vinyl acetate-vinyl alcohol terpolymer, and 300 parts by weight of a mixed solvent of methyl ethyl ketone, toluene and methyl isobutyl ketone, thereby obtaining a magnetic tape.

EXAMPLE 39

The general procedure of Example 27 was repeated except that a dispersion composition of 100 parts by weight of TiO, 6 parts by weight of a quaternary ammonium salt (Catanac SN, American Cyanamide Co., Ltd.), 20 parts by weight of a polyurethane elastomer, and 300 parts by weight of a mixed solvent of methyl ethyl ketone, toluene and methyl isobutyl ketone was used, and the quaternary ammonium salt was added to the carbon black so as to allow the salt to be adsorbed on the carbon black surfaces, to which the mixed solvent and polyurethane were subsequently added, thereby obtaining a magnetic tape.

COMPARATIVE EXAMPLE 6

The general procedure of Example 27 was repeated except that the non-magnetic resin layer was not formed but the magnetic paint of Example 27 to which 15 parts by weight of carbon black was added was directly applied to the polyester film, thereby obtaining a magnetic tape.

COMPARATIVE EXAMPLE 7

The general procedure of Example 27 was repeated using, instead of the dispersion of Example 27, a dispersion of 100 parts by weight of TiO, and 15 parts by weight of a polyurethane elastomer in 300 parts by weight of a mixed solvent of methyl ethyl ketone, toluene and methyl isobutyl ketone, thereby obtaining a magnetic tape.

The magnetic tapes of Examples 27 through 39 and Comparative Examples 6 and 7 were subjected to the measurement similar to the foregoing examples but under conditions of a temperature of 40° C. and a relative humidity of 25%. The results are shown in Table 3 below.

TABLE 3

|  |  |  | $\mu_s$ | | |
|---|---|---|---|---|---|
|  | Charged Voltage (V) | Half Life | Before Travelling Operation | After 50 Cycles of Travelling Operation | Peeling Test |
| Ex. 27 | 660 | 24 | 0.47 | 0.55 | Not peeled |
| Ex. 28 | 660 | 19 | 0.44 | 0.60 | " |
| Ex. 29 | 660 | 26 | 0.40 | 0.53 | " |
| Ex. 30 | 700 | 31 | 0.44 | 0.48 | " |
| Ex. 31 | 630 | 24 | 0.45 | 0.57 | " |
| Ex. 32 | 610 | 18 | 0.44 | 0.55 | " |
| Ex. 33 | 610 | 19 | 0.45 | 0.51 | " |
| Ex. 34 | 620 | 25 | 0.44 | 0.60 | " |
| Ex. 35 | 650 | 24 | 0.42 | 0.55 | " |
| Ex. 36 | 650 | 25 | 0.44 | 0.53 | " |
| Ex. 37 | 640 | 25 | 0.45 | 0.54 | " |
| Ex. 38 | 620 | 22 | 0.42 | 0.68 | " |
| Ex. 39 | 620 | 18 | 0.45 | 0.58 | " |
| Com. Ex. 6 | 1160 | 152 | 0.40 | 1.77 | Completely peeled |
| Com. Ex. 7 | 1090 | 89 | 0.46 | 1.25 | Partially peeled |

As will be seen from the above results, similar results are obtained as in Examples 1 through 13 though the measuring conditions used are more severe. Upon comparing the results of Examples 32 and 39 with each other, the adsorption of the antistatic agent on the TiO particles gives little influence on the agent.

In Examples 27 through 39, the TiO was used in an amount of 100 parts by weight per 15-30 parts by weight of the binder. It was confirmed that similar tendencies were obtained when the TiO content was varied within a wide range defined before.

Moreover, it was found that the magnetic tapes of the invention were excellent in magnetic characteristics such as a flux density and sensitivity because these antistatic agents were not directly contained in the magnetic layer.

As will be seen from the foregoing examples and comparative examples, the magnetic tapes of the invention are more resistant to peeling because of the presence of the non-magnetic layer containing antistatic agents and/or TiO, carbon black or a mixture thereof and are thus durable. The magnetic tapes are particularly described, but the present invention is also effective in imporving the characteristic properties of other types of magnetic recording media such as floppy discs, hard discs and the like.

What is claimed is:

1. A magnetic recording medium comprising a support, a non-magnetic resin layer formed on at least one side of said support and made of a mixture of an antistatic agent and a resin binder, and a magnetic recording layer formed on said non-magnetic resin layer and made of magnetic particles dispersed throughout a binder, said antistatic agent being at least one member selected from the group consisting of alkyl sulfates, alkylarylsulfates, alkylphosphates, alkylaminesulfates, quaternary ammonium salts, quaternary ammonium resins, imidazoline derivatives, sorbitan esters, polyoxyethylene alkyl or aryl ethers, ethanolamides, betaines, and primary, secondary and tertiary amines, and being contained in an amount from 1 to 100 parts by weight per 100 parts by weight of the binder of said non-magnetic resin layer.

2. A magnetic recording medium according to claim 1, wherein said medium has said non-magnetic resin layer and said magnetic recording layer on one side of said support.

3. A magnetic recording medium according to claim 1, wherein said medium had said non-magnetic resin layer and said magnetic recording layer on each side of said support.

4. A magnetic recording medium according to claim 1, wherein said antistatic agent is used in an amount not smaller than 5 parts by weight per 100 parts by weight of the binder of said non-magnetic resin layer.

5. A magnetic recording medium according to claim 1, wherein said mixture further comprises from 5 to 100 parts by weight of a curing agent per 100 parts by weight of the binder of said non-magnetic resin layer.

6. A magnetic recording medium according to claim 1, wherein said mixture further comprises carbon black, titanium monoxide or a mixture thereof in the form of finely divided particles.

7. A magnetic recording medium according to claim 6, wherein the carbon black particles are used in an amount of from 5 to 30 parts by weight per 100 parts by weight of the binder of said non-magnetic resin layer and have an average size of 1 to 50 millimicrons.

8. A magnetic recording medium according to claim 6, wherein the titanium monoxide particles are used in an amount of from 50 to 1000 parts by weight per 100 parts by weight of the binder of said non-magnetic resin layer and have an average size of from 0.01 to 5 microns.

9. A magnetic recording medium according to claim 8, wherein said amount of titanium monoxide is in the range of from 400 to 800 parts by weight per 100 parts by weight of the binder of said non-magnetic resin layer.

* * * * *